United States Patent [19]
Atkin et al.

[11] Patent Number: 4,780,263
[45] Date of Patent: Oct. 25, 1988

[54] LOCATION OF JOINTED TEXTILES IN A MOLD

[75] Inventors: Howard S. Atkin; David M. Rogers; George S. Wilson, all of Harrogate, England

[73] Assignee: Dunlop Limited, United Kingdom

[21] Appl. No.: 66,011

[22] Filed: Jun. 24, 1987

[30] Foreign Application Priority Data

Aug. 7, 1986 [GB] United Kingdom ............... 8619342

[51] Int. Cl.$^4$ ............................................. B29C 65/72
[52] U.S. Cl. ................................ 264/546; 264/46.6; 264/511
[58] Field of Search ............ 264/46.6, 46.8, 257, 264/258, 511, 516, 546; 112/418, 419

[56] References Cited

U.S. PATENT DOCUMENTS

| | | | |
|---|---|---|---|
| 2,576,324 | 11/1951 | Wirt | 112/419 |
| 4,115,170 | 9/1978 | Sanson | 264/46.8 |
| 4,190,010 | 2/1980 | Bibby | 112/419 |
| 4,535,017 | 8/1985 | Kuckein et al. | 112/418 |

FOREIGN PATENT DOCUMENTS 210587 2/1987 European Pat. Off. ........... 264/46.8

Primary Examiner—Jan H. Silbaugh
Assistant Examiner—Allan R. Kuhns
Attorney, Agent, or Firm—Stevens, Davis, Miller & Mosher

[57] ABSTRACT

Accurate and consistent location of jointed textiles within a mold is achieved by inserting the outer surfaces of the joint (12) into the cavity of an elongate, generally U-shaped member (20) and securing the joint to the member, e.g. by sewing (21). The joint/channel member assembly can then be automatically gripped and placed in the desired position in the mold. The method is of particular application to processes involving vacuum-molding.

4 Claims, 2 Drawing Sheets

LOCATION OF JOINTED TEXTILES IN A MOLD

This invention relates to a method for the location of jointed textiles in a mold and in particular to the location of jointed textiles in a vacuum mold prior to the vacuum-forming process.

Vacuum-forming of textile-covered foam articles is well known per se and consists essentially of shaping the textile to the inner surface of the mold by application of a vacuum, filling the textile-lined mold with a foam-forming mixture and closing the mold. This is readily accomplished when the textile consists of a continuous material. However, when the textile consists of two or more pieces of material jointed by means of seams, it is difficult to locate the seams accurately and consistently within the mold. It is known to carry out such location manually, but this gives rise to an increase in the amount of labor involved and consequently to an increase in the production costs of the product.

It has now been found that accurate and consistent location of a jointed textile within a mold can be achieved quickly by inserting the outer surfaces of the joint into the cavity of an elongate, generally U-shaped member, thereby facilitating the automatic gripping and placing of the seam in the mold. Accordingly, in a first embodiment, the present invention provides a method for the location of jointed textiles in a mold, in which the outer surfaces of the joint are placed within the cavity of an elongate, generally U-shaped channel member, whereby the said channel member/joint assembly can be gripped externally and placed in a desired position in the mold.

In a second embodiment, the present invention provides a method as described in the immediately-preceding paragraph, in which a textile layer including one or more channel member/joint assemblies is attached across the mouth of a vacuum mold, a positive air-pressure is applied to the mold and then removed, each said assembly subsequently being pressed into the mold and held in position therein by means of a vacuum.

Preferably, the elongate U-shaped channel member is made of a resilient material, e.g. a resilient plastics material. Suitably, the elongate, U-shaped channel member is secured to the joint, e.g. by sewing. It is particularly convenient for the abutting textile surfaces and the elongate, U-shaped channel member to be sewn together along the seam line in a single operation.

A preferred embodiment of the present invention will be illustrated, merely by way of example, in the following description and with reference to the accompanying drawings, wherein like numerals denote like parts.

Figure 1:
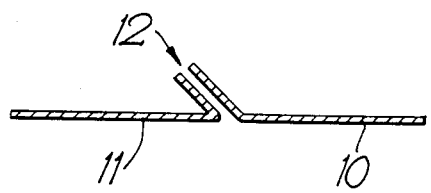
FIGS. 1 to 3 show, in transverse section, the application of the elongate, U-shaped channel member to a textile joint.
Figure 2:
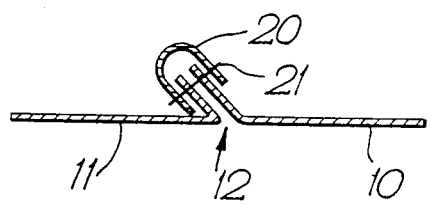

In FIGS. 1 and 2, two portions 10 and 11 of a textile material are placed in abutment to form a seam 12. The seam 12 is placed within the cavity of an elongate, U-shaped channel member 20 and secured thereto by sewing as shown at 21. The assembly can then, as shown in FIG. 3, be placed in position over divider 31 of mold 30.

Figure 3:
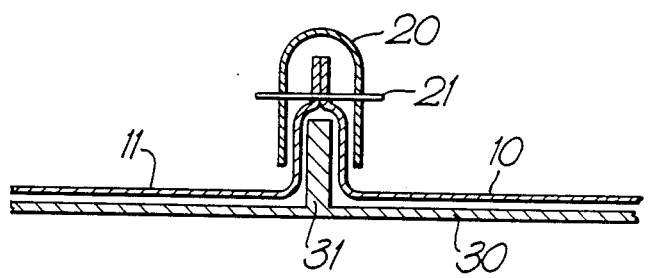
Figure 4:
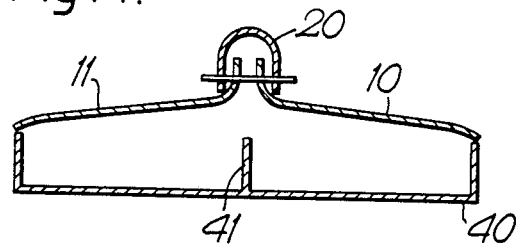
FIGS. 4 to 8 show, again in transverse section, the sequence of steps in the vacuum-forming process according to the present invention.

Referring now to FIGS. 4 to 8, the sequence of events is as follows:

An assembly as shown in FIG. 3 is attached across the mouth of a vacuum mold 40 containing a divider 41, as shown in FIG. 4.

Figure 5:
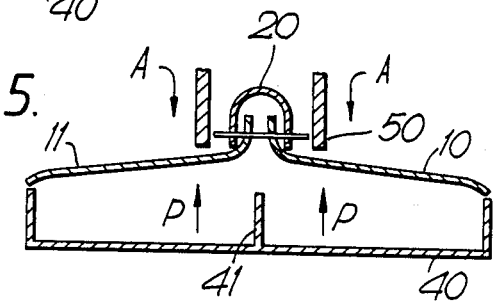

A pair of grippers (shown schematically at 50) moves in the direction of arrows A in FIG. 5 and a positive air-pressure is applied to the mold, this being indicated by arrows P.

Figure 6:
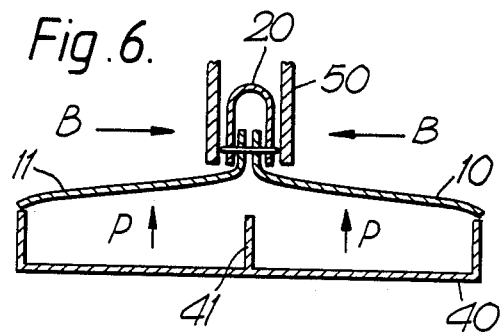

The pressure causes the channel member/joint assembly to assume a position substantially normal to the horizontal plane of the mold, this position being maintained by movement of the grippers in the direction of arrows B in FIG. 6.

Figure 7:
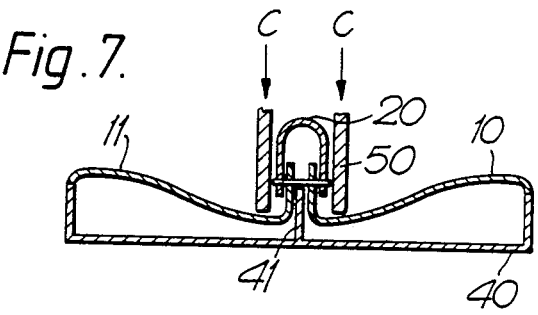

The pressure P is removed and the grippers are then moved in the direction of arrows C in FIG. 7 so that the assembly is correctly located in the mold.

Figure 8:
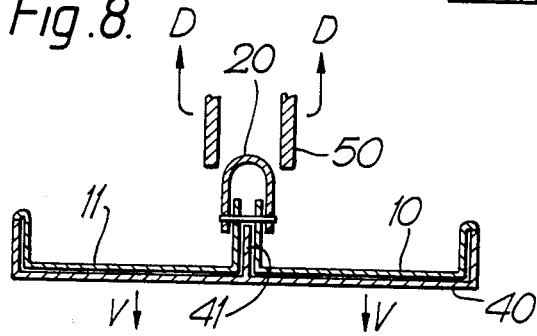

A vacuum V is applied to the mold to hold the jointed textile in position and the grippers are then released and moved away from the mold in the direction of arrows D in FIG. 8.

We claim:

1. Method for the positive location within a vacuum mold of a textile fabric assembly including seamed portions, said method comprising:
    (a) placing each said seamed portion within an elongate substantially U-shaped channel member and securing said seamed portion to said channel member to form an integral joint assembly;
    (b) attaching said textile fabric assembly across the mouth of a vacuum mold;
    (c) applying a positive air-pressure to said mold whereby said integral joint assembly is caused to assume a position substantially normal to the horizontal plane of said mold;
    (d) gripping said integral joint assembly by means of grippers;
    (e) removing said positive pressure and simultaneously moving said grippers whereby said integral joint assembly is positively located in a desired position within said mold;
    (f) applying a vacuum to said mold to maintain said integral joint asssembly in said desired position;
    (g) releasing and removing said grippers from said integral joint assembly.

2. The method of claim 1, wherein said channel member is made of a resilient material.

3. The method of claim 2, wherein said resilient material is a resilient plastics material.

4. The method of claim 1, wherein said seam is secured to said channel member by sewing.

* * * * *